(12) United States Patent
Morgan

(10) Patent No.: US 7,007,808 B2
(45) Date of Patent: Mar. 7, 2006

(54) STATIONARY STORAGE RACK FOR POTS, PANS AND LIDS

(76) Inventor: Fletcher Morgan, 4990 Coquina Key Dr., S.E., St. Petersburg, FL (US) 33705

( * ) Notice: Subject to any disclaimer, the term of this patent is extended or adjusted under 35 U.S.C. 154(b) by 0 days.

(21) Appl. No.: 10/194,275

(22) Filed: Jul. 15, 2002

(65) Prior Publication Data

US 2003/0168415 A1  Sep. 11, 2003

Related U.S. Application Data

(63) Continuation-in-part of application No. 29/156,657, filed on Mar. 6, 2002, now Pat. No. Des. 471,768.

(51) Int. Cl.
A47G 19/08 (2006.01)

(52) U.S. Cl. .................................... 211/41.11
(58) Field of Classification Search ............... 211/40, 211/41.1, 41.2, 41.3, 181.1; D6/462
See application file for complete search history.

(56) References Cited

U.S. PATENT DOCUMENTS

| 27,604 | A | * | 3/1860 | Scott | 37/370 |
|---|---|---|---|---|---|
| 1,065,000 | A | * | 6/1913 | Sarter et al. | 211/41.11 |
| 1,842,118 | A | * | 1/1932 | Resnik et al. | 211/41.11 |
| 2,190,065 | A | | 2/1940 | Griffin | |
| 2,516,088 | A | | 7/1950 | Einhorn | |
| 2,679,736 | A | | 6/1954 | Duchin | |
| 2,891,676 | A | * | 6/1959 | Miller | 211/41.2 |
| 3,013,670 | A | | 12/1961 | Mayer | |
| 3,164,108 | A | | 1/1965 | Romero | |
| 4,592,471 | A | | 6/1986 | Bross | |
| 4,756,582 | A | | 7/1988 | Heien | |
| 4,943,029 | A | | 7/1990 | Szuster | |
| 5,660,284 | A | | 8/1997 | Vaughn | |
| 6,012,593 | A | * | 1/2000 | Knittel et al. | 211/41.11 |

* cited by examiner

Primary Examiner—Sarah Purol
(74) Attorney, Agent, or Firm—John S. Hale; Gipple & Hale

(57) ABSTRACT

A storage rack for storing pots, pans, skillets and lids comprising a storage rack constructed of a stand and a base member mounted to the stand. A plurality of wire members are mounted to the base member and extending upward from the base member, the plurality of wire members including U shaped wire members and offset U shaped wire members with a plurality of rods secured to the offset portion. The rods extend upward and away from the offset portion and a handle is mounted to the base member.

3 Claims, 4 Drawing Sheets

STATIONARY STORAGE RACK FOR POTS, PANS AND LIDS

CROSS-REFERENCE TO RELATED APPLICATIONS

This a continuation-in-part application of U.S. Design patent application Ser. No. 29/156,657 filed Mar. 6, 2002, now U.S. Pat. No. D,471,768.

TECHNICAL FIELD OF THE INVENTION

The present invention generally relates to a storage rack and more specifically is directed toward a stationary storage rack with upright wire members for holding cooking pots, pans, skillets and their respective lids.

BACKGROUND OF THE PRIOR ART

Most cooks have accumulated a collection of covered cookware that may range from small saucepans to large pots and skillets and include many other sizes of pots and pans and containers with lids. Even those householders who do not consider themselves as real cooks have an assortment of covered containers in which to cook food both on top of a stove and in an oven. Thus almost all kitchens contain significant numbers of pots, pans and other cooking containers and lids for same. The cooking containers and their respective lids must be stored when they are not in use and this problem, may be compounded by the lack of storage space in many kitchens.

Where and how these kitchen implements are stored may vary substantially from kitchen to kitchen. In some instances, pots and cooking containers are stacked in a nested fashion with the largest diameter pot on the bottom and successively smaller pots on top. While this might be a relatively efficient way to store pots, pans and other cooking vessels such as casseroles, the lids and covers usually cannot be stored effectively in a nested stack. Most kitchens which use this nesting stack storage method for pots also have a disorganized pile of lids and covers. The cook then must rummage through the pile to locate the correct lid for the container he or she wants to use and move stacks of containers. In a home kitchen this exercise is very frustrating and can be quite chaotic when people and children gather in the kitchen during cooking of the meal.

Some cooks simply cover their pots and pans with the lids and store them side-by-side, on cabinet shelves. Although this method allows the cook to locate the correct lid quickly, it requires significantly more storage space than stacking or nesting the containers. Many home kitchens simply do not have the storage space to store the numbers of cooking containers required by large families or serious cooks.

A storage rack is useful for holding pots, pans, skillets and lids for same. In the prior art shaped wire stands have been used to elevate an appliance or cooking container or to provide open storage for related use utensils, splatter screens and similar items. One form of commonly used stand is a ceramic or marble/granite planar base mounted on a wire housing such as is seen in U.S. Pat. No. 2,679,736 issued Jun. 1, 1954.

U.S. Pat. No. 2,516,088 issued Jul. 18, 1950 is directed toward a folding dish drying rack formed from round wire stock which has a protective coating of rubber or synthetic resin. A plurality of elements are pivotally supported between an adjacent pair of longitudinal rods. Each element is mounted with a crank portion positioned outwardly and a lug portion positioned inwardly for attachment to and manipulation by a push bar. The push bar is slidably mounted in slots formed in a pair of mounting plates secured to the ends of a base.

U.S. Pat. No. 5,660,284 issued Aug. 26, 1997 is directed toward a storage rack for holding and storing cooking container lids and like shaped objects. The rack has a base with a pair of feet allowing it to be placed in a vertical or horizontal position. A plurality of adjustable crosspieces forming rests or steps are positioned at desired locations along the edges of the bracket members to hold the container lids at a storage angle.

Other commonly used types of stands are a wire rack with legs and supports such as that shown in U.S. Pat. Nos. 2,190,065, 2,891,676, 3,013,670, 3,164,108, 4,592,471, 4,756,582 and 4,943,029.

The prior art, therefore, has failed to provide a storage rack or holder for cooking containers and their lids and covers that may be easily assembled by the purchaser or by a consumer, that may be positioned in one of several convenient orientations in a home and which can be easily adjusted as needed to hold and store a number of lids of varying and different dimensions. Consequently, there is a need for such a rack in the home kitchen to allow storage areas to be organized effectively and efficiently to reduce clutter and provide the time savings which result when storage spaces are organized.

Accordingly, the novel storage rack has been developed to hold pots, pans, skillets and lids which resolves the problems of counter and cabinet space, cluttered storage, mislaid lids, matching lids to containers, allowing containers and lids to be consolidated and hidden from sight in a cabinet or enclosed area, as well as being easily cleaned.

SUMMARY OF THE INVENTION

The present invention is directed toward a stationary plastic coated wire storage rack comprising a stand, a base member mounted to the stand and a plurality of wire members mounted to said base member and extending upward from said base member. The plurality of wire members include U shaped wire members of varying heights and offset U shaped wire members of varying heights having a plurality of upright angled rods secured to the offset portion of the offset U shaped wire members. The U shaped wire members are secured to the base member and a handle is mounted to one end of the base member.

It is an object of the present invention to provide a storage rack for cooking containers and their covers and lids which can be custom assembled by the purchaser or consumer to accommodate a specific collection of cooking containers and lids without the need of tools, fasteners or adhesives.

It is a further object of the present invention to provide a fixed storage rack for cooking container lids that is sized to hold all of the lids for a selected set or brand of cookware.

It is yet another object of the invention to provide a storage rack which can be easily assembled with a minimum of instructions and general lack of mechanical skill by the consumer.

It is yet another object of the invention to provide the user with storage space for storage of cooking utensils allowing easy access of same for use as well as reducing the amount of counter space and cabinet space needed for such storage.

It is a further object o the invention to provide a storage rack which may be easily and inexpensively fabricated from round wire stock or other suitable materials having strength and durability.

In the accompanying drawings, there is shown illustrative embodiments of the invention from which these and other objectives, novel features and advantages will be readily apparent.

DETAILED DESCRIPTION OF THE INVENTION

The cooking container and lid storage rack of the present invention is ideally suited for use in the home as it provides a compact storage rack for containers and their respective lids and covers that allows easy access to the lids and covers. The capability to vary the dimensions of the container and lid-supporting components of the rack by inserting various wire support members on the rack base allows the consumer to customize the rack as needed to hold a varied assortment of containers and lids. The preferred embodiment of the storage rack of the present invention is designed to be assembled by the user and is fully adjustable to hold a number of cooking containers and their respective lids of different heights and diameters at an optimum storage angle.

Figure 1:
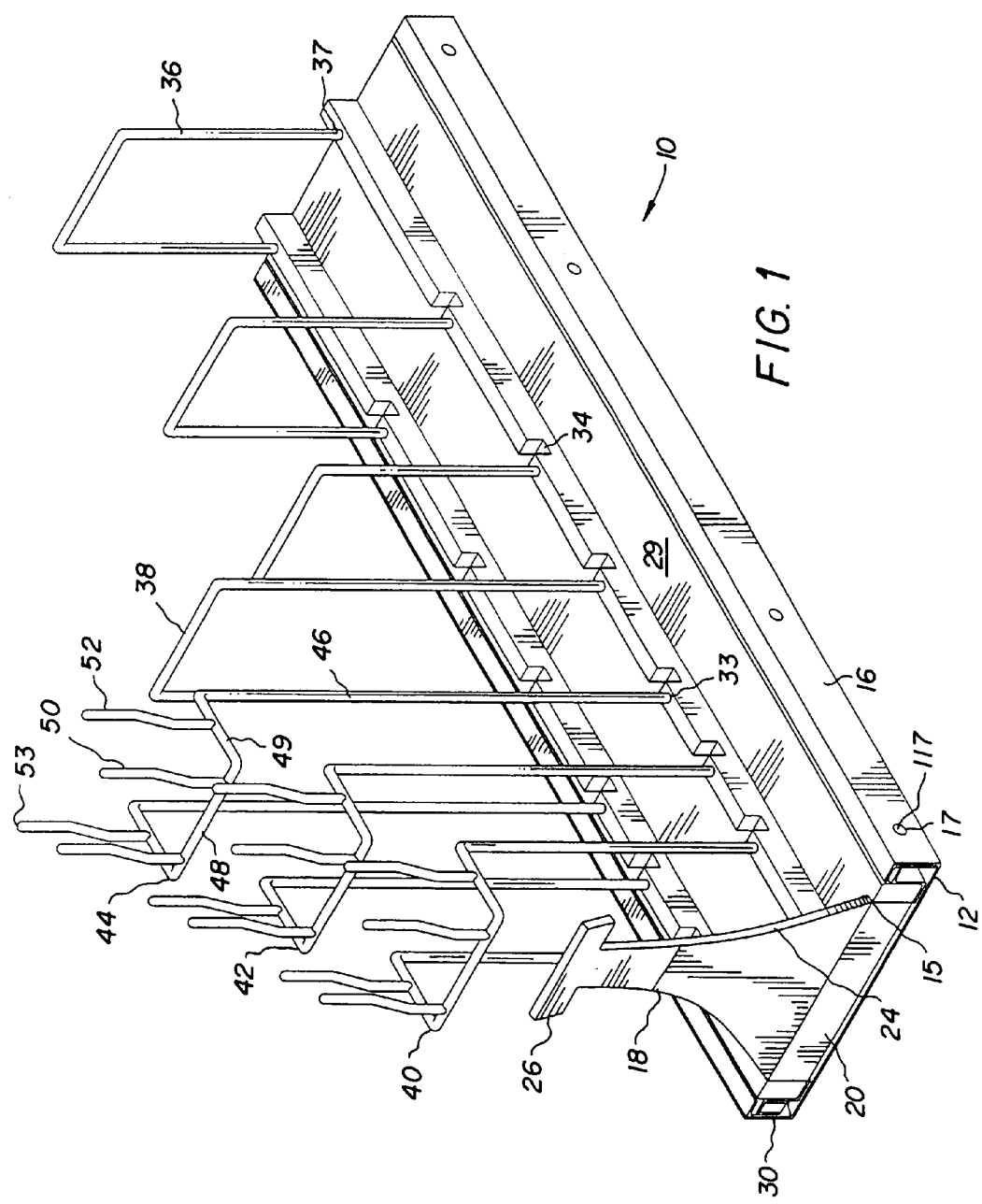
FIG. 1 is a perspective view of the stationary storage rack for pots, pans and lids.
Figure 2:
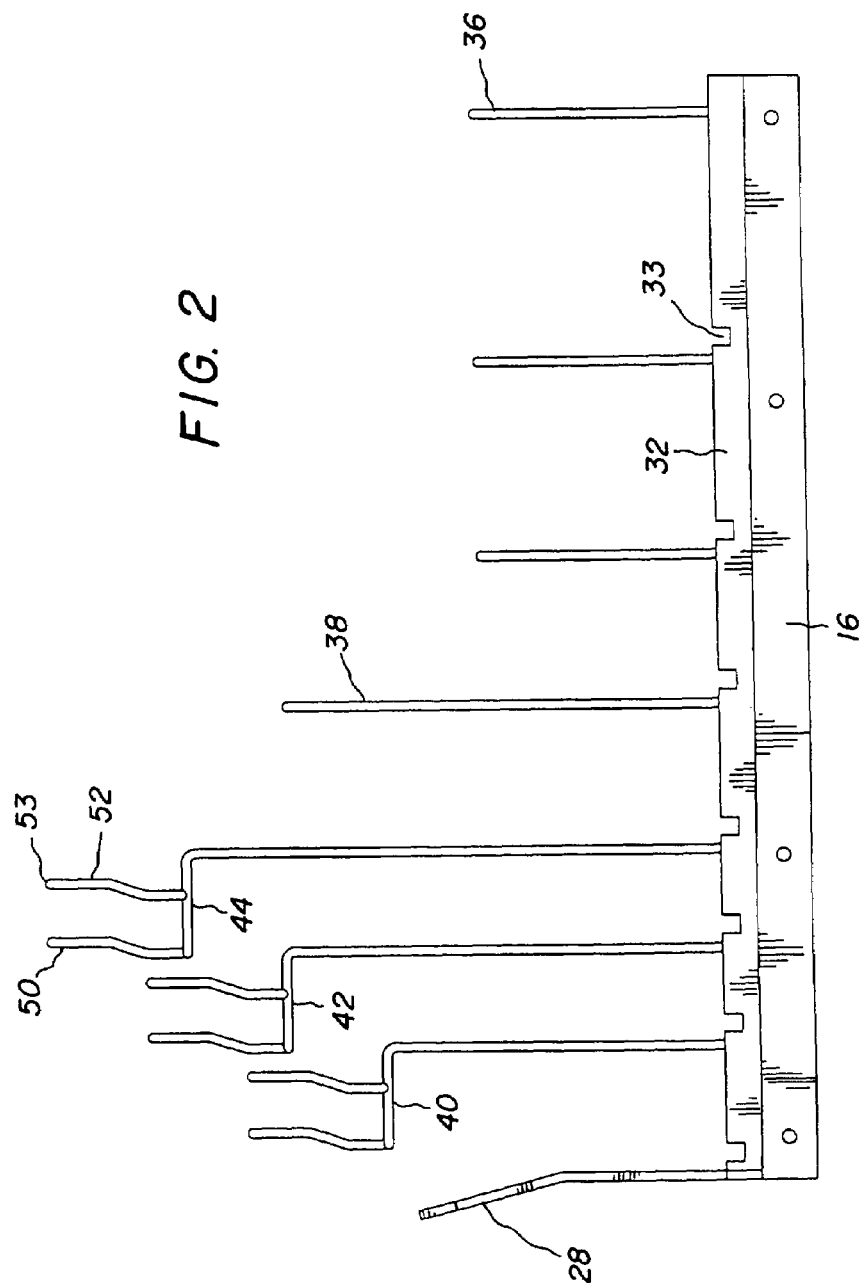
FIG. 2 is a side elevational view of the storage rack of FIG. 1.
Figure 3:
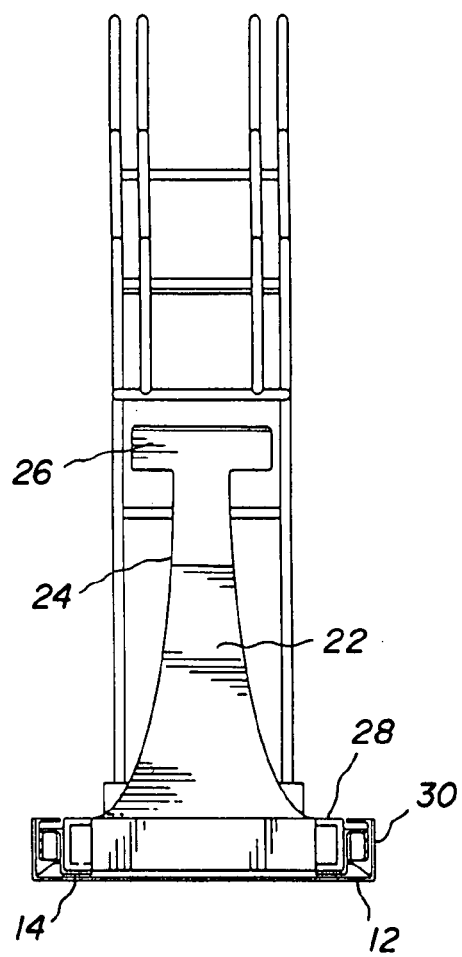
FIG. 3 is a front elevational view of the storage rack of FIG. 1.
Figure 4:
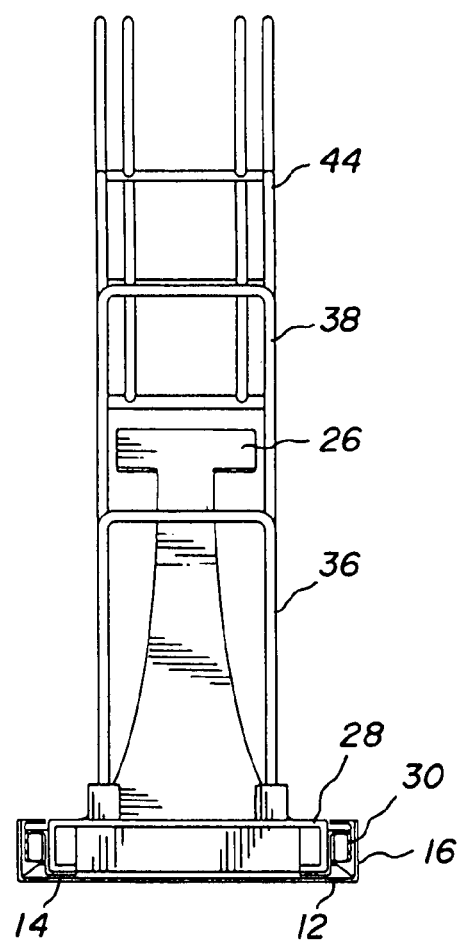
FIG. 4 is a rear elevational view of the storage rack of FIG. 1.
Figure 5:
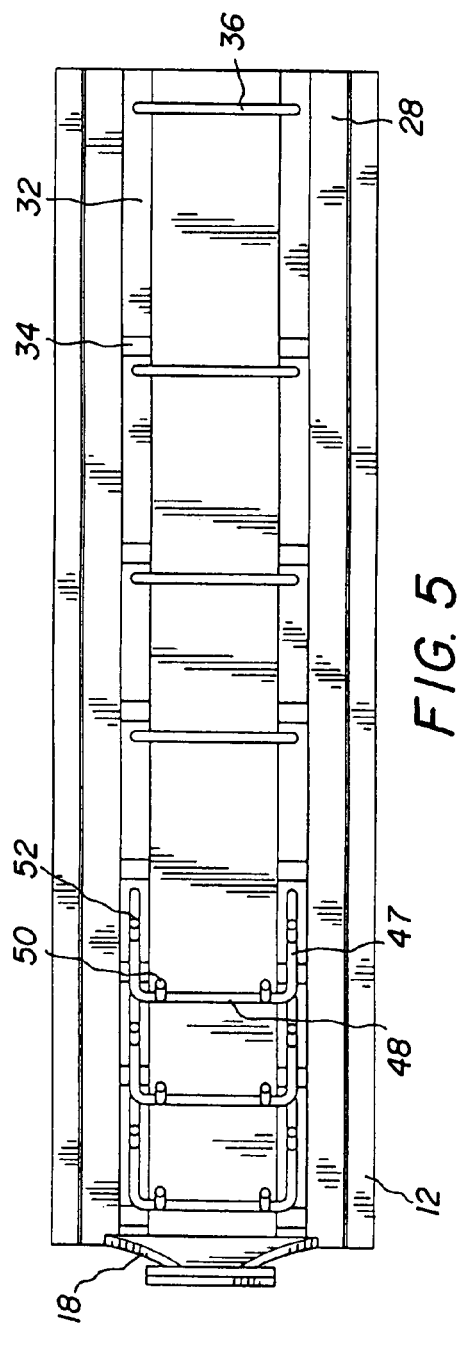
FIG. 5 is a top plan view of the storage rack shown in FIG. 1.
Figure 6:
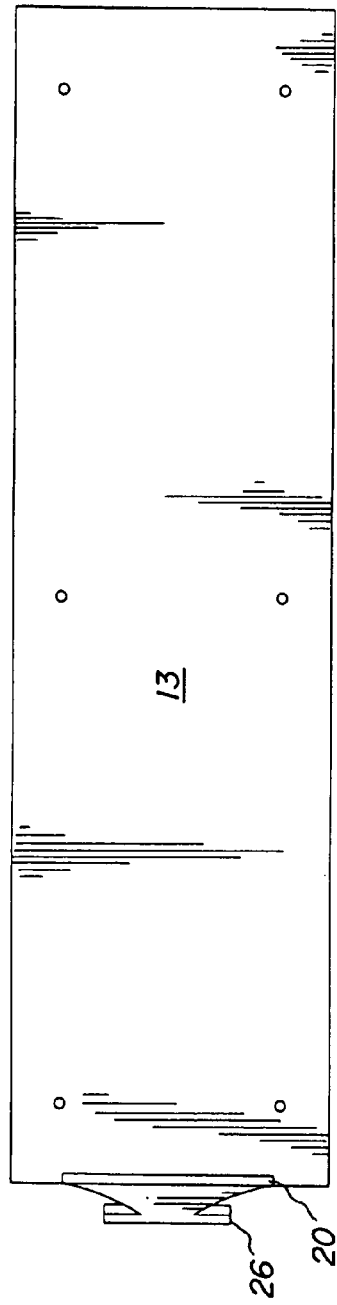
FIG. 6 is a bottom plan view of the storage rack shown in FIG. 1.

The preferred embodiment and best mode of the stationary storage rack invention is shown in FIGS. 1–6. The stationary pot, pan and lid storage rack assembly 10 is constructed with a stand 12 having a planar base 13 with upturned flanges forming "C" shaped integral sides 16. The sides define a plurality of holes 17 cut through the back portion of the C. The holes 17 are aligned with the holes cut in the base 14 so that the stand 12 and base 14 can be secured together as will be later described. A curved "T" shaped handle 18 with a rectangular base portion 20 is secured in a notched portion or step 15 cut in base 14. The handle 18 has a stem portion 22 which is curved or angled away from the base portion 20 and has curved side walls 24 which terminate in a rectangular knob or head 26.

The base 14 is constructed with a rectangular support member 28 having side rail members 30 secured on opposite sides of the support member 28 allowing the same to be positioned with the "C" chamber formed by the integral sides 16 of stand 12. The base 14 is secured to the stand sides 16 by appropriate fasteners such as screws, threaded members, bolts or rivets 117 which are inserted into holes 17 through aligned holes (not shown) in the side of the side rail members 30. Two parallel support rails 32 are secured to the top surface 29 of the rectangular support member 28 and define a series of aligned bores or blind bores 33 which are adapted to receive and hold the feet of the wire support members. The support rails 32 also define a series of aligned rectangular notch seats 34 which allow seating of lids and the lips of the pots and pans. The notch seats 34 preferably have a rectangular cross section although rounded or angular cross sections could be used and run across the support rails 32 transverse to the axis of the support rails. The notch seats 34 hold the container and lids in place against the wire support members and prevent the cooking pans, pots and skillets and their associated lids from sliding when adjacent items are removed for use leaving the original space for the item being returned.

A plurality of "U" shaped wire support members 36 are mounted in the rear section of the stationary assembly with the ends or feet 37 of the wire support members 36 being mounted in the respective aligned bores or blind bores 33 cut into the parallel support rails 32. A taller "U" shaped wire support member 38 is mounted in the middle section of the base 14 in respective aligned blind bores 33 in the parallel support rails. The diameter of the bores 33 are substantially the same as the diameter of the wire feet portion of the wire members being inserted therein A plurality of staggered height offset wire support members 40, 42 and 44 are mounted on the proximal or front section of the base 14 in respective bores in the parallel support rails 32. Each wire support member offset portion 44 is constructed with two parallel legs 46 and a "U" shaped cross support 47 integrally formed with each leg and extending transverse to the axis of the parallel legs 46. A front support cross bar 48 of the cross support 47 has two angled offset upright rods 50 mounted to the cross bar 48 a distance inside the parallel axes of the support arms 49 and two angled offset upright rods 52 mounted to the support arms 49 outside of the upright rods 50 mounted on cross bar 48. Each of the angled offset upright rods 50, 52 is formed with a blunt or rounded end 53 to preclude scratching of the utensils. In addition each wire member is preferably coated with a rubber, a rubberized material or plastic coating such as PVC to prevent scratching of the cooking utensils and to protect the wires against rust.

Each notch 34 is located behind a base of handle 18 and the wire members 36, 38, 40, 42 and 44 so that a lid, pan or lip of the cooking utensil can be seated in the notch.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. A storage rack comprising a planar base member with upturned flanges forming C shaped integral sides, a support member with side rail members on opposite sides of said support member allowing the same to be positioned in the C shaped integral sides of said planar base member, fastening means securing said planar base member to said support member, support rails secured to a top surface of said support member, said support rails defining a plurality of bores which are adapted to receive and hold wire support members, said support rails defining a plurality of aligned notch seats to allow seating of lids, a plurality of U shaped wire support members mounted in said support rail bores, a plurality of wire support members with an offset portion mounted in said support rail bores, said offset portion having a U shape with a plurality of upright rods extending from said offset portion.

2. A storage rack as claimed in claim 1 wherein said notch seats have a rectangular cross section.

3. A storage rack as claimed in claim 1 wherein said upright rods define an angled portion.

* * * * *